(12) United States Patent
Ver Steeg et al.

(10) Patent No.: US 8,566,481 B2
(45) Date of Patent: Oct. 22, 2013

(54) MANAGING CONFIGURATION DATA

(75) Inventors: William C. Ver Steeg, Alpharetta, GA (US); Kenneth Morse, Duluth, GA (US)

(73) Assignee: Cisco Technology, Inc., San Jose, CA (US)

( * ) Notice: Subject to any disclaimer, the term of this patent is extended or adjusted under 35 U.S.C. 154(b) by 411 days.

(21) Appl. No.: 12/481,818

(22) Filed: Jun. 10, 2009

(65) Prior Publication Data
US 2010/0318686 A1  Dec. 16, 2010

(51) Int. Cl.
*G06F 3/00* (2006.01)
*G06F 9/00* (2006.01)

(52) U.S. Cl.
USPC .......... 710/8; 710/9; 710/10; 710/11; 710/12; 710/13; 710/14; 710/104; 713/1; 713/2; 713/100

(58) Field of Classification Search
None
See application file for complete search history.

(56) References Cited

U.S. PATENT DOCUMENTS

| | | | |
|---|---|---|---|
| 5,530,469 A * | 6/1996 | Garfinkle | 725/116 |
| 5,530,754 A | 6/1996 | Garfinkle | |
| 5,561,708 A * | 10/1996 | Remillard | 379/93.19 |
| 5,563,648 A | 10/1996 | Menand et al. | |
| 5,625,406 A | 4/1997 | Newberry et al. | |
| 5,652,613 A | 7/1997 | Lazarus et al. | |
| 5,699,107 A * | 12/1997 | Lawler et al. | 725/58 |
| 5,721,815 A | 2/1998 | Ottesen et al. | |
| 5,742,829 A | 4/1998 | Davis et al. | |
| 5,751,282 A * | 5/1998 | Girard et al. | 715/721 |
| 5,764,992 A * | 6/1998 | Kullick et al. | 717/170 |
| 5,774,859 A * | 6/1998 | Houser et al. | 704/275 |
| 5,790,935 A | 8/1998 | Payton | |
| 5,809,287 A | 9/1998 | Stupek, Jr. et al. | |
| 5,809,554 A | 9/1998 | Benayon et al. | |
| 5,815,194 A | 9/1998 | Ueda | |
| 5,983,316 A | 11/1999 | Norwood | |
| 5,999,740 A * | 12/1999 | Rowley | 717/173 |
| 6,002,394 A | 12/1999 | Schein et al. | |
| 6,081,830 A | 6/2000 | Schindler | |
| 6,137,549 A | 10/2000 | Rasson et al. | |
| 6,272,677 B1 * | 8/2001 | Lam et al. | 717/170 |
| 6,285,632 B1 | 9/2001 | Ueki | |
| 6,360,366 B1 | 3/2002 | Heath et al. | |

(Continued)

FOREIGN PATENT DOCUMENTS

EP  0 489 204 A1  6/1992
EP  0 811 911 A2  12/1997

(Continued)

OTHER PUBLICATIONS

Canadian Office Action cited in Application No. 2,514,482 mailed Apr. 14, 2011, 4 pages.

(Continued)

*Primary Examiner* — Henry Tsai
*Assistant Examiner* — Jing-Yih Shyu
(74) *Attorney, Agent, or Firm* — Merchant & Gould

(57) ABSTRACT

Systems and method embodiments of managing configuration data are disclosed. One method embodiment comprises storing account-specific configuration data at a device included among a group of devices, the account specific-configuration data capable of being shared among the group of devices common to a single account; and storing device-specific configuration data at the device, the device-specific configuration data not shared among the group of devices.

17 Claims, 6 Drawing Sheets

(56) References Cited

U.S. PATENT DOCUMENTS

| | | | |
|---|---|---|---|
| 6,507,950 B1 | 1/2003 | Tsukidate et al. | |
| 6,538,656 B1 | 3/2003 | Cheung et al. | |
| 6,598,231 B1 | 7/2003 | Basawapatna et al. | |
| 6,629,227 B1 | 9/2003 | Jerding et al. | |
| 6,637,029 B1 | 10/2003 | Maissel et al. | |
| 6,745,239 B1 * | 6/2004 | Hubbard | 709/220 |
| 6,754,904 B1 | 6/2004 | Cooper et al. | |
| 6,757,911 B1 | 6/2004 | Shimoji et al. | |
| 6,813,775 B1 | 11/2004 | Finseth et al. | |
| 6,874,075 B2 | 3/2005 | Jerding et al. | |
| 6,928,653 B1 | 8/2005 | Ellis et al. | |
| 6,973,669 B2 | 12/2005 | Daniels | |
| 7,028,327 B1 | 4/2006 | Dougherty et al. | |
| 7,120,924 B1 | 10/2006 | Katcher et al. | |
| 7,146,627 B1 | 12/2006 | Ismail et al. | |
| 7,234,035 B2 | 6/2007 | Jerding et al. | |
| 7,539,834 B2 * | 5/2009 | Jerding et al. | 711/170 |
| 7,657,916 B2 | 2/2010 | Rodriguez et al. | |
| 7,665,111 B1 | 2/2010 | Barton et al. | |
| 2001/0034883 A1 | 10/2001 | Zigmond | |
| 2002/0007493 A1 | 1/2002 | Butler et al. | |
| 2002/0059623 A1 | 5/2002 | Rodriguez et al. | |
| 2002/0120932 A1 | 8/2002 | Schwalb | |
| 2002/0152472 A1 | 10/2002 | Istvan et al. | |
| 2003/0084455 A1 | 5/2003 | Gudorf et al. | |
| 2003/0110499 A1 | 6/2003 | Knudson et al. | |
| 2003/0182663 A1 | 9/2003 | Gudorf et al. | |
| 2003/0229892 A1 | 12/2003 | Sardera | |
| 2005/0028208 A1 | 2/2005 | Ellis et al. | |
| 2005/0076367 A1 | 4/2005 | Johnson et al. | |
| 2005/0251827 A1 * | 11/2005 | Ellis et al. | 725/47 |
| 2006/0161956 A1 | 7/2006 | Wasilewski et al. | |
| 2006/0179432 A1 * | 8/2006 | Walinga et al. | 717/171 |
| 2007/0233999 A1 | 10/2007 | Jerding et al. | |
| 2007/0266121 A1 * | 11/2007 | Saeed et al. | 709/220 |
| 2008/0189737 A1 * | 8/2008 | Ellis et al. | 725/38 |
| 2009/0025081 A1 * | 1/2009 | Quigley et al. | 726/21 |
| 2009/0044226 A1 * | 2/2009 | Ellis et al. | 725/46 |
| 2009/0150948 A1 | 6/2009 | Rodriguez et al. | |
| 2010/0156639 A1 * | 6/2010 | Herwig et al. | 340/572.1 |
| 2010/0234009 A1 * | 9/2010 | Antani et al. | 455/419 |
| 2010/0251303 A1 * | 9/2010 | Ellis et al. | 725/43 |

FOREIGN PATENT DOCUMENTS

| | | |
|---|---|---|
| EP | 0 841 615 A2 | 5/1998 |
| EP | 0 945 792 A2 | 9/1999 |
| EP | 1 041 821 A2 | 10/2000 |
| WO | WO 95/16958 | 6/1995 |
| WO | WO 99/15964 | 4/1999 |
| WO | WO 99/53401 | 10/1999 |
| WO | WO 00/04707 A1 | 1/2000 |
| WO | WO 01/84320 A3 | 11/2001 |

OTHER PUBLICATIONS

"Fail Safe Message for Insufficient Disk Space" IBM Technical Disclosure Bulletin, IBM Corp. New York, US, vol. 37, No. 4A (Apr. 1994), p. 513.

Simonson J. et al., "Version augmented URIs for reference permanence via an Apache module design," Computer Networks and ISDN Systems, North Holland Publishing, Amsterdam, NL, vol. 30, No. 1-7 (Apr. 1998), pp. 337-345.

Japanese Office Action dated May 18, 2009 in Application No. JP 2001-580676.

Japanese Office Action dated Nov. 13, 2009 in Application No. JP 2001-580676.

European Examination dated Sep. 19, 2007 in Application No. EP 01934987.7.

Canadian Office Action dated Jun. 26, 2009 in Application No. CA 2,606,753.

Canadian Office Action dated Nov. 25, 2008 in Application No. CA 2,606,753.

Canadian Office Action dated May 2, 2007 in Application No. CA 2,408,284.

International Search Report dated Sep. 8, 2003 in PCT Application No. PCT/US01/14149.

Written Opinion dated Feb. 12, 2004 in PCT Application No. PCT/US01/14149.

Knudson et al., Co-pending U.S. Appl. No. 09/330,792, filed Nov. 6, 1999.

Canadian Office Action cited in Application No. 2,514,482 mailed Mar. 9, 2010.

* cited by examiner ical field

MANAGING CONFIGURATION DATA

TECHNICAL FIELD

The present disclosure relates generally to subscriber devices, and more specifically, to managing configuration data.

BACKGROUND

Service providers deliver many different types of services to consumers over broadband networks, including video (e.g., television, movies, sporting events), music, telephone, and Internet data services. These services are received and/or consumed using various electronics devices such as set-top boxes, digital home communications terminals, residential gateways, digital music receivers, personal computers, personal digital assistants, digital telephones, etc.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DESCRIPTION OF EXAMPLE EMBODIMENTS

Overview

The embodiments disclosed herein provide systems and methods for managing configuration data. One such system embodiment comprises a memory encoded with executable instructions; and a processor configured to execute the instructions to retrieve, from a remote server, information that describes last remotely stored configuration data for an account, the account shared by a device along with other devices; compare the retrieved information with information that describes locally stored configuration data for the account; download the last remotely stored configuration data from the remote server to replace the locally stored configuration data responsive to the comparison indicating that the last remotely stored configuration data is more recent than the locally stored configuration data; retrieve, from the remote server, information that describes last remotely stored configuration data for the device; compare the retrieved information that describes the last remotely stored configuration for the device with information that describes locally stored configuration data for the device; and download the last remotely stored configuration data for the device from the remote server to replace the locally stored configuration data for the device responsive to the comparison indicating that the last remotely stored configuration data for the device is more recent than the locally stored configuration data for the device.

One such method embodiment comprises storing account-specific configuration data at a device included among a group of devices, the account specific-configuration data capable of being shared among the group of devices common to a single account; and storing device-specific configuration data at the device, the device-specific configuration data not shared among the group of devices.

Yet another such method embodiment comprises receiving an account code identifying an account, the account shared by plural devices; receiving a device code identifying a device among the plural devices; downloading account-specific configuration data associated with the account code from a remote server responsive to determining that the account code already exists; downloading device-specific configuration data associated with the device code from the remote server responsive to determining that the device code already exists; and operating in accordance with the downloaded account-specific and device-specific configurations.

Example Embodiments

Figure 1:
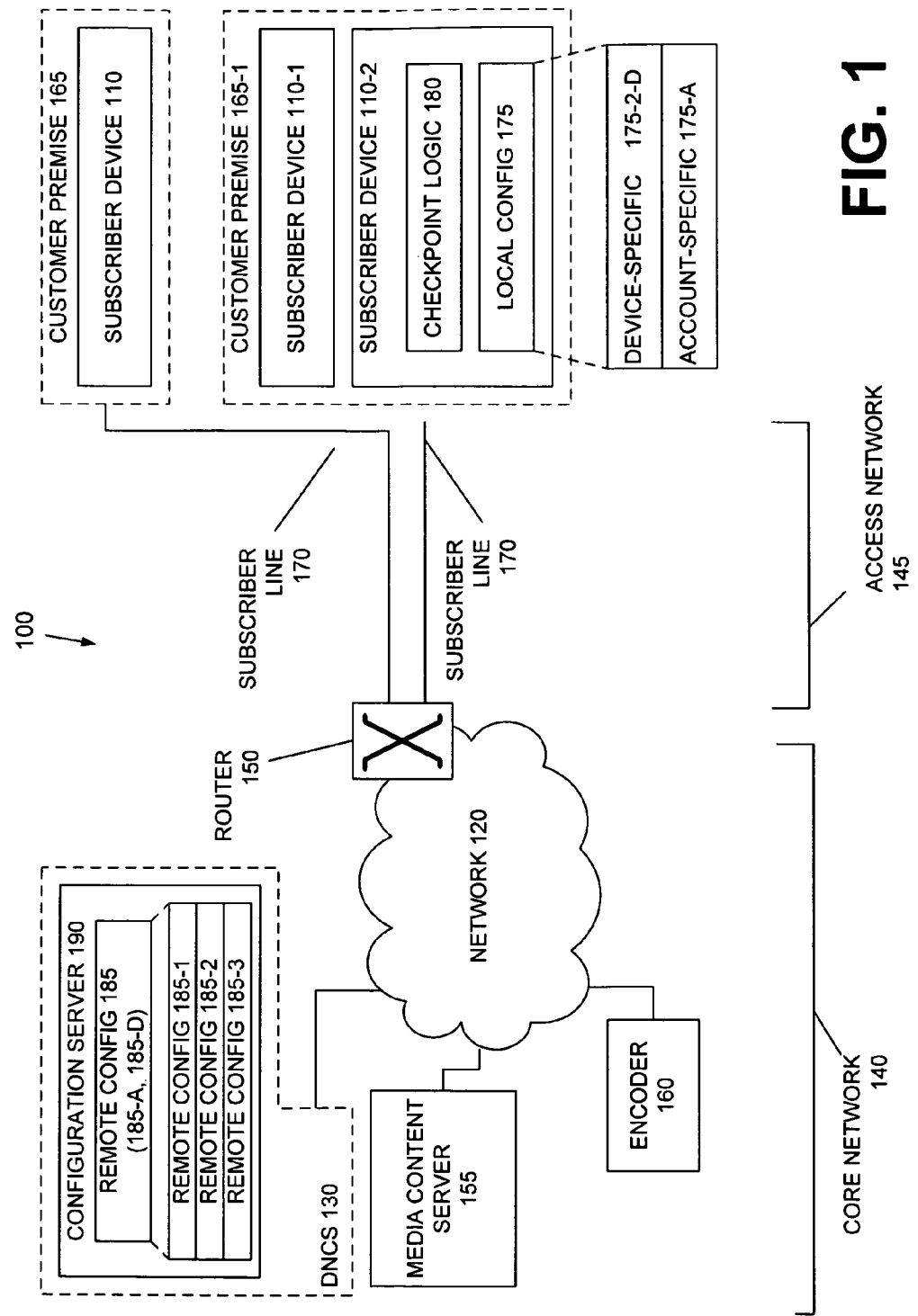
FIG. 1 is a block diagram of an environment including a system and method for managing configuration data using checkpoints, in accordance with some embodiments described herein.

FIG. 1 is a block diagram including a system and method for managing configuration (e.g., device and/or account) data. System 100 delivers services such as television programming, movies, sports events, music, Internet data access, etc. to subscriber devices 110 over network 120. In addition to subscriber devices 110, system 100 also includes a digital network control system (DNCS) 130 (e.g., located at a headend) which manages and provisions subscriber devices 110. The system 100 includes a core network 140 and an access network 145, with routers 150 located at the edge between the two networks. The content of the delivered services may be provided by various sources such as media content servers 155 and encoders 160 which also communicate over network 120.

Each subscriber device 110 resides at a particular physical location or customer premise 165, and each customer premise is connected to access network 145 via a subscriber line 170. Multiple subscriber devices 110 can reside at the same customer premise 165 and thus receive services over the same subscriber line 170. Subscriber devices 110 at the same customer premise 165 share the same account. Note that in some embodiments, a customer premise may have multiple accounts, where plural subscriber devices 110 may share one or more of the multiple accounts. In the example environment of FIG. 1, customer premise 165-1 includes two subscriber devices, 110-1 and 110-2. Examples of subscriber devices include set-top boxes, digital video recorders, digital home communications terminals, residential gateways, digital media receivers, digital music receivers, personal computers, personal digital assistants, digital telephones, etc.

As should be known to a person of ordinary skill in the art, various network arrangements or topologies can be used between the network edge and the customer premise 165. In some embodiments, each customer premise 165 connects to network 120 through a corresponding subscriber gateway (not shown), and multiple subscriber gateways communicate with an access multiplexer. Various technologies can be used to implement access network 145, including (but not limited to) a digital subscriber loop (DSL), an active or passive optical network (PON), a MetroEthernet, fiber to the premises (FTTP), fiber to the curb (FTTC), and hybrid fiber-coax (HFC). In some embodiments, access network 145 is point-to-point. In others, access network 145 is point-to-multipoint.

A subscriber device 110 utilizes various types of configuration data which control various aspects of the device, examples of which are discussed below. The techniques described herein allow this configuration data to be checkpointed in a hierarchical and/or distributed manner. Specifically, configuration data is stored locally (175), and checkpoint logic 180 (residing within subscriber device 110) also periodically (or in some embodiments, aperiodically) stores the configuration data remotely (185) at a configuration server 190, which in some embodiments is part of DNCS 130. Thus, configuration server 190 has multiple instances of remotely stored configuration data 185, one for each device 110 (shown in FIG. 1 as 185-1, 185-2, and 185-3). Although FIG. 1 illustrates an embodiment where local configuration data is also stored at the configuration server 190, in some embodiments, the local configuration data for a device (e.g., newly installed for a newly subscribed user or users, etc.) may not be stored remotely in view of no existing record of the device and/or account codes at a headend (explained below). When checkpoint logic 180 detects that locally stored configuration data 175 is out of date, logic 180 updates the device configuration by downloading remotely stored configuration data 185. Details of the techniques used for hierarchical and/or distributed checkpointing will be discussed later in connection with FIGS. 2-5.

Configuration data may be divided into account-specific data and device-specific data: each device 110 has its own device-specific data (e.g., 175-2-D, or generally, 175-D), but all devices on the same account share the same account-specific data (175-A). In some embodiments, one device at the customer premise stores the account-specific configuration data 175-A. This device may be referred to as the "master". In other embodiments, a separate storage unit, accessible to all devices at the customer premise, stores the account-specific configuration data 175-A. In still other embodiments, a gateway at the customer premises, through which the devices may access subscriber line 170, also stores account-specific configuration data 175-A.

Subscriber devices 110 coordinate access to account-specific configuration data 175-A. Any of a variety of shared access mechanisms may be used. For example, devices that coordinate scheduled program recordings among themselves may extend the coordinating mechanism to cover write and/or read access to account-specific configuration data 175-A. As another example, devices that compete among themselves for bandwidth on subscriber line 170 may extend the sharing mechanism to cover write and/or read access to account-specific configuration data 175-A.

Examples of account-specific configuration data 175-A include: account number; account authorization information; names of users on the account; time zone; personal identification (PIN) code; customized user interface information ("skin"); local area network (LAN) or wireless local area network (WLAN) identifiers for the account (e.g., media access control (MAC) address, service set identifier (SSID), etc.); favorite channels; future recording requests; playout status of a recording; and purchase history. Examples of device-specific configuration data 175-D include: serialization information; diagnostic information; last channel watched; viewing statistics; and historical performance metrics. Each item of account-specific data 175-A can also be replicated in the device-specific portion of the configuration data, in which case the device-specific data 175-D supersedes the account-specific information.

Configuration data can also be divided in other ways, such as into protected information and unprotected information. Protected information persists across an equipment swap. That is, if a particular subscriber device unit is swapped out with, or replaced by, another unit, the protected information is transferred to the new unit, such as through configuration server 190. Unprotected information is not persisted across an equipment swap of subscriber device 110. In some embodiments, unprotected information persists over a reboot of subscriber device 110.

It is noted that reference herein to a device operating in a particular configuration refers to operation based on the corresponding configuration data (e.g., 175-A and/or 175-1-D). For instance, a device referenced as having a default account-specific configuration operates based on reception and/or processing of default account-specific configuration data, as explained further below.

Figure 2:
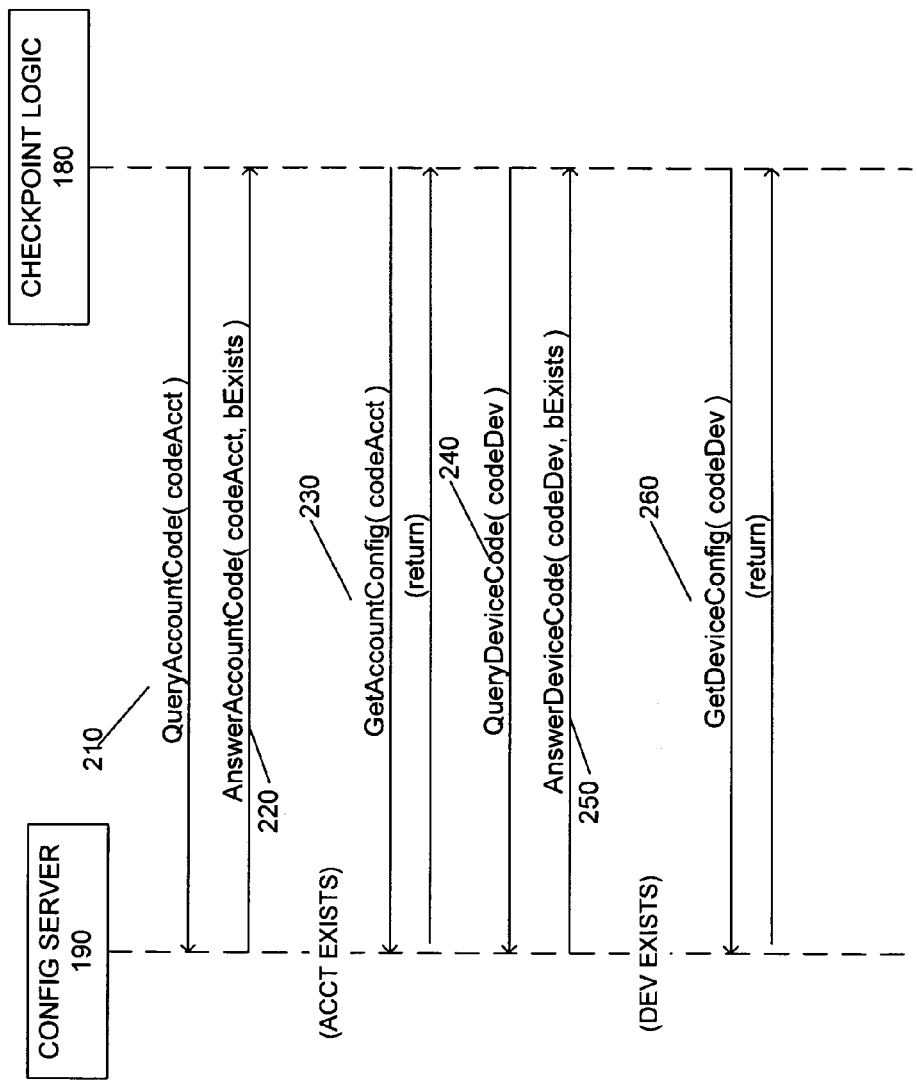
FIG. 2 is a messaging diagram showing interaction between the configuration server and the checkpoint logic of FIG. 1 during a configuration initialization process, in accordance with some embodiments of the system of FIG. 1.

FIG. 2 is a messaging diagram showing interaction between configuration server 190 and checkpoint logic 180 during an example configuration initialization process, in accordance with some embodiments of system 100. When subscriber device 110 is installed or provisioned, checkpoint logic 180 obtains an account code and a device code, as discussed later in connection with FIG. 3. Checkpoint logic 180 then queries configuration server 190 to discover whether the account code exists (e.g., whether the configuration server 190 or associated equipment has a corresponding record of the account code for the subscriber device 110 or otherwise does not recognize the account code) (message 210), and server 190 responds (message 220). In the example scenario of FIG. 2, the account code does exist (e.g., is recognized by the configuration server 190), so logic 180 proceeds to obtain account-specific configuration data from configuration server 190 (message 230). Next, checkpoint logic 180 queries configuration server 190 to discover whether the device code exists (e.g., similarly, whether the configuration server 190 or associated equipment has a corresponding record of the device code for the subscriber device 110 or otherwise does not recognize the device code) (message 240), and server 190 responds (message 250). In the example scenario of FIG. 2, the device code also exists (e.g., is recognized), so logic 180 proceeds to obtain the device-specific configuration data from configuration server 190 (message 260). In this example, separate transactions are used for account and device information, but other embodiments combine this into a single transaction. Further, in some embodiments, a response to a query of whether the account code and/or device code exists (e.g., response 220 or 250, indicating the code exists) may also include the respective configuration data, obviating the need for a separate transaction to obtain the configuration data (e.g., 260 or 230 is omitted in some embodiments).

Figure 3:
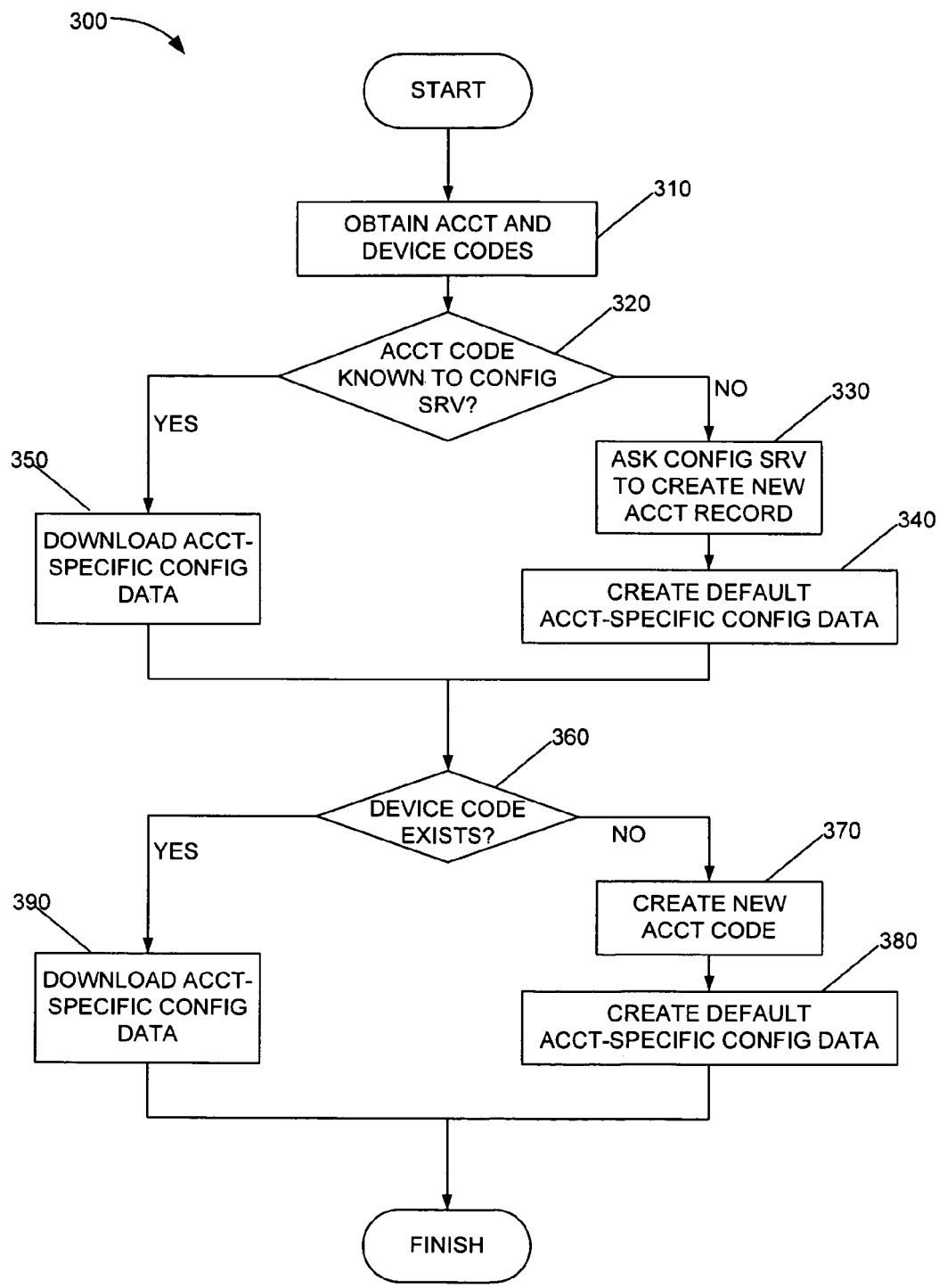
FIG. 3 is a flowchart showing operation of the configuration initialization process, in accordance with some embodiments of the checkpoint logic of FIG. 1.

Further details about the operation of checkpoint logic 180 during configuration initialization, including the behavior when the codes are not recognized by configuration server 190, is now discussed in connection with the flowchart of FIG. 3. Process 300, within logic 180, runs when subscriber device 110 is installed or provisioned. The process begins at block 310, where an account code and a device code are obtained. In some embodiments, these codes are obtained from a user (e.g. an installer inputting the codes while running an install program). In other embodiments, these codes are obtained from a provisioning server (e.g., DNCS 130). At block 320, logic 180 interacts with configuration server 190 to determine whether the account code is new to configuration server 190, or is already known to configuration server 190 (see FIG. 2). If the account code is not known to configuration server 190, at block 330, logic 180 interacts with DNCS 130 (e.g., directly, or in some embodiments, via the configuration server 190) to create a new account record (e.g., at the head-end) having this account code. At block 340, logic 180 creates or otherwise provides account-specific configuration data (175-A in FIG. 1) with default values. Processing of the device code, starting at block 360, is discussed below, but returning to block 320, if process 300 determines that the account code already exists on configuration server 190, the account-specific configuration data for this account code is downloaded from configuration server 190 at block 350 (see FIG. 2 for further details).

Continuing with the present example embodiment, in either case (new configuration data with default values or downloaded existing configuration data), the device code is processed next. At block 360, logic 180 interacts with configuration server 190 to determine whether the device code for the given account code is new (to the configuration server 190) or is already known to configuration server 190 (see FIG. 2). If the device code is not known, at block 370, logic 180 interacts with DNCS 130 (e.g., directly or indirectly via configuration server 190) to create a new device record (e.g., at the head-end) for this device code. At block 380, logic 180 creates or otherwise provides device-specific configuration data (175-D in FIG. 1) with default values. Returning to block 360, if process 300 determines that the device code already exists on configuration server 190, the device-specific configuration data for this device code is downloaded from configuration server 190 at block 390 (see FIG. 2 for further details). Configuration initialization process 300 is then complete, and subscriber device 110 operates in accordance with the downloaded or default configuration data.

Process 300 may handle different initialization scenarios for a new subscriber device 110. For instance, in one example scenario, a user (end user or installer) runs the install process for a new device 110 at a location without any existing service. Neither the device code nor the account code entered by the user are recognized by configuration server 190, and so this device ends up with default account-specific and default device-specific configurations. In other words, new account and device configurations are instantiated in the new device.

In another example scenario, a user runs the install process for a new device at a location with existing service. The account code is recognized by configuration server 190, but not the device code, and so this device ends up with the existing account configuration (already stored on configuration server 190). In other words, an existing account configuration is instantiated (cloned) but a new device configuration (with default values) is instantiated.

In a third example scenario, a new device replaces an old (e.g., outdated, unserviceable, or nonfunctional) device. The location has existing service and so the account code is recognized. The user inputs the device code belonging to the old device. That old device code is recognized, and as a result, the existing account configuration and existing device configuration is instantiated (cloned) in the new device.

When a change occurs to locally stored configuration data 175, the updated local configuration data is checkpointed to configuration server 190. The checkpoint process uses an arbitration scheme to arbitrate the write access to configuration server 190 by various subscriber devices 110, so that the server is not overwhelmed. Various arbitration schemes can be used. For example, in one embodiment, each subscriber device 110 has a time window in which it is allowed write access to configuration server 190. In some of these embodiments, a hash bucket is used to map a particular subscriber device 110 to its time window. For example, the media access control (MAC) address of the device is hashed to generate a number value between 0 and 24*60, and the device is allowed write access to configuration server 190 during the one minute each day that corresponds to this value.

In other embodiments, a time window is not assigned, and instead a subscriber device 110 verifies that no other device 110 is currently writing to configuration server 190 before proceeding itself with a write. In yet another embodiment, a time window is not assigned, and instead, a subscriber device 110 requests write access to configuration server 190, and waits until that access is granted, before proceeding itself with a write.

The arbitration scheme may also take into account the current load on the network and/or the server. That is, even if a particular device 110 is granted access, that device may wait for another opportunity if the current load is more than a predetermined threshold. Thus, in some embodiments, the frequency and timing of checkpoints to configuration server 190 are controlled by a combination of state variables stored at device 110 and an indication of network and server utilization. In some embodiments, these arbitration state variables are stored as part of locally stored configuration data 175-D.

Figure 4:
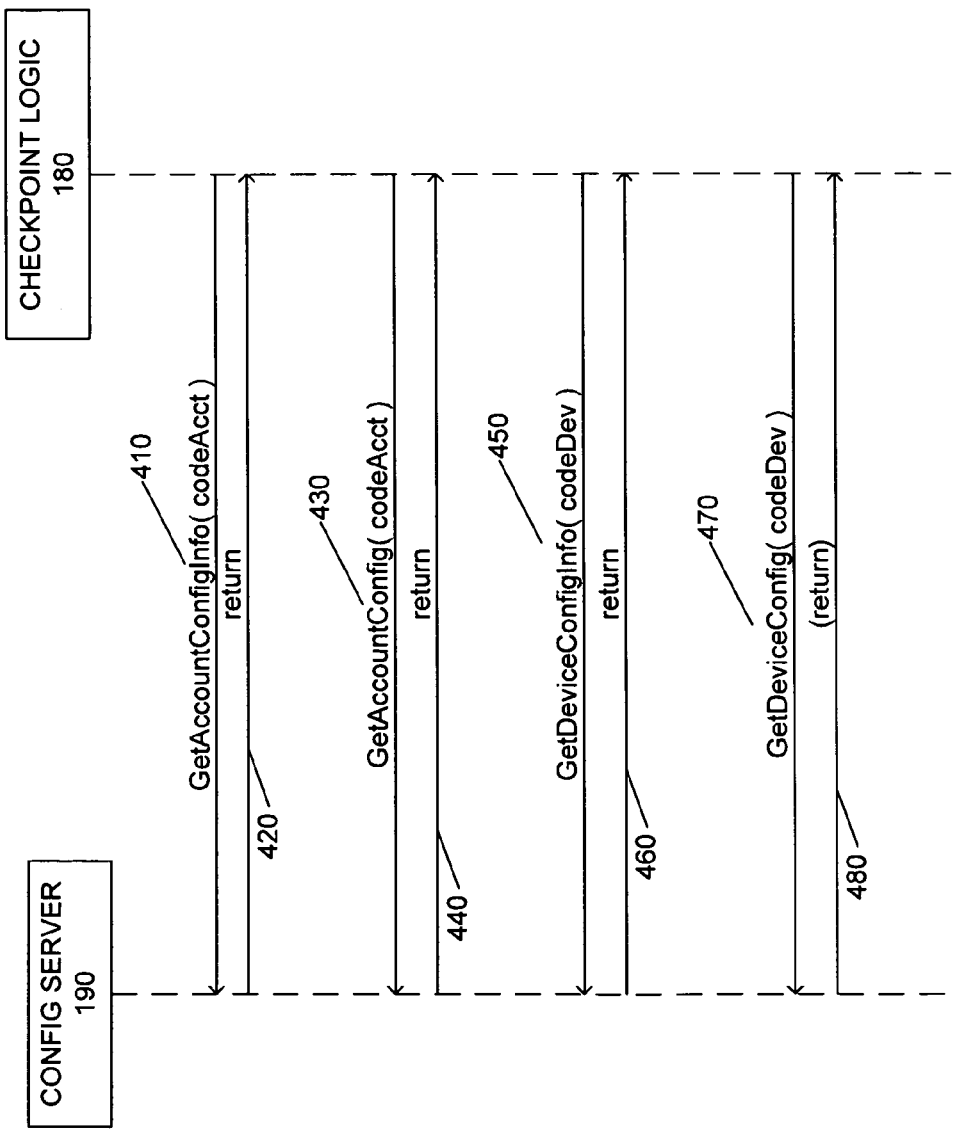
FIG. 4 is a messaging diagram showing interaction between the configuration server and the checkpoint logic of FIG. 1 during a configuration restore process, in accordance with some embodiments of the system of FIG. 1.

FIG. 4 is a messaging diagram showing interaction between configuration server 190 and checkpoint logic 180 during a configuration restore process, in accordance with some embodiments of system 100. Checkpoint logic 180 queries configuration server 190 for descriptive information (e.g., identifying information) about account-specific remotely stored configuration data 185-A data (message 410). Server 190 provides the information (message 420), which in some embodiments includes a version number. In other embodiments, this descriptive information includes a date. Logic 180 examines the descriptive information, and makes a determination as to whether to retrieve account-specific configuration data from configuration server 190. (This determination will be discussed in further detail in connection with the flowchart of FIG. 5.) In the particular scenario illustrated in FIG. 4, logic 180 requests (430) the account-specific remotely stored configuration data 185-A from configuration server 190, and server 190 returns (440) the configuration data.

Checkpoint logic 180 then queries configuration server 190 for descriptive information about device-specific remotely stored configuration data 185-D (message 450) and server 190 provides the information (message 460). As before, logic 180 examines the descriptive information, and makes a determination as to whether to retrieve device-specific configuration data from configuration server 190 (discussed later in connection with FIG. 5). In the particular scenario illustrated in FIG. 4, logic 180 requests (470) the device-specific remotely stored configuration data 185-D from configuration server 190, and server 190 returns (480) the configuration data. In some embodiments, some of the queries and/or responses may be combined (reduced number of transactions).

In the example embodiment shown in FIG. 4, specific GetConfigInfo queries and response messages are illustrated as example mechanisms used in some embodiments to obtain descriptive information about remotely stored configuration data 185. However, various mechanisms may be used to obtain this information. For example, in another embodiment, checkpoint logic 180 issues a digital storage media command and control (DSM-CC) User-to-Network configuration (UN- Config) request to configuration server 190, and the response contains the configuration information.

Figure 5:
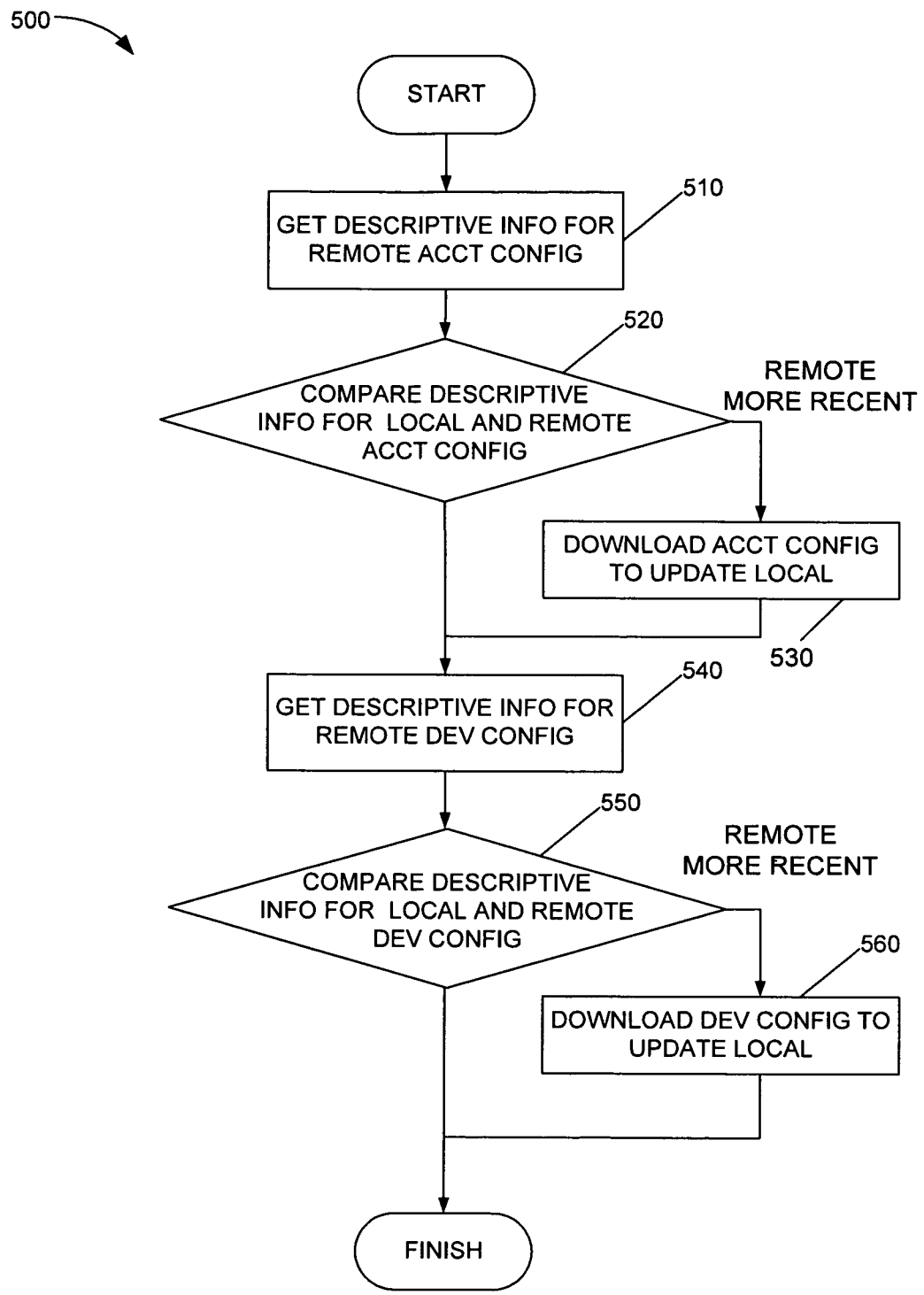
FIG. 5. is a flowchart showing operation of the configuration restore process, in accordance with some embodiments of the checkpoint logic of FIG. 1.

Further details about the operation of checkpoint logic 180 during an example configuration restore process are now discussed in connection with the flowchart of FIG. 5. Process 500, within logic 180, runs as part of (or shortly after) boot. The process begins at block 510, where logic 180 interacts with configuration server 190 to obtain descriptive information (e.g., identification information, including version number, or date, etc.) about account-specific remotely stored configuration data 185-A (see FIG. 4). At block 520, the remote descriptive information corresponding to the account-specific remotely stored configuration data 185-A is compared to local descriptive information corresponding to account-specific locally-stored configuration data 175-A. If the comparison indicates that the account-specific remotely stored configuration data is more recent than the account-specific locally-stored configuration data (e.g., as indicated by version number or date), block 530 updates the account-specific locally stored configuration data 175-A with the account-specific remotely-stored configuration data obtained from configuration server 190 (see FIG. 4).

Regardless of whether an update occurs or not, process 500 continues at block 540, where logic 180 interacts with configuration server 190 to obtain descriptive information about device-specific remotely stored configuration data 185-D (see FIG. 4). At block 550, the remote descriptive information corresponding to the device-specific remotely stored configuration data 185-D is compared to the local descriptive information corresponding to the device-specific remotely stored configuration data 185-A. If the comparison indicates that the device-specific remotely stored configuration data is more recent than the device-specific locally-stored configuration data, block 560 updates device-specific locally stored configuration data 175-D with the remotely-stored device-specific configuration data obtained from configuration server 190 (see FIG. 4). Configuration restore process 500 is then complete.

Figure 6:
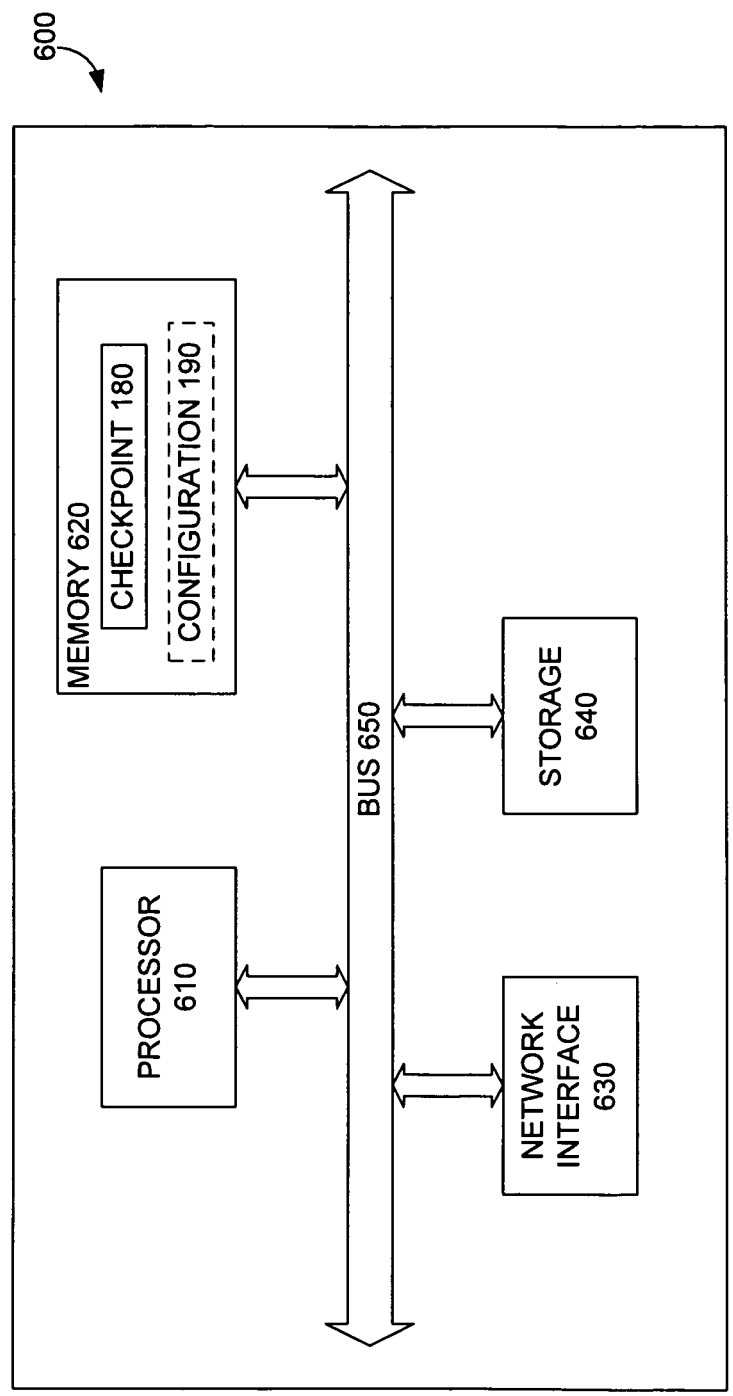
FIG. 6 is a hardware block diagram of a general purpose computing device which can be used to implement the checkpoint logic and/or the configuration server of FIG. 1.

FIG. 6 is a hardware block diagram of a general purpose computing device which can be used to implement checkpoint logic 180 and/or configuration server 190. Computing device 600 contains a number of components that are well known in the computer arts, including a processor 610, memory 620, a network interface 630, and storage device 640. These components are coupled via a bus 650. Omitted from FIG. 6 are a number of conventional components that are unnecessary to explain the operation of the computing device 600.

Checkpoint logic 180 and/or configuration server 190 can be implemented in software, hardware, or a combination thereof. In some embodiments, such as that shown in FIG. 6, logic 180 and/or server 190 are implemented in software, i.e., instructions retrieved from memory for execution on a processor (e.g., microprocessor, microcontroller, network processor, extensible processor, reconfigurable processor, etc.). In other embodiments, logic 180 and/or server 190 are implemented in hardware logic, including (but not limited to) a programmable logic device (PLD), a programmable gate array (PGA), a field programmable gate array (FPGA), an application-specific integrated circuit (ASIC), a system on chip (SoC), and a system in package (SiP).

The systems and methods disclosed herein can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain or store the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: a random access memory (RAM); a read-only memory (ROM); an erasable programmable read-only memory (EPROM or Flash memory). A specific example using magnetic technology includes (but is not limited to) a floppy diskette or a hard disk. Specific examples using optical technology include (but are not limited to) a compact disc read-only memory (CD-ROM).

The software components illustrated herein are abstractions chosen to illustrate how functionality is partitioned among components in some embodiments of the systems and methods for managing configuration data disclosed herein. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead.

Software components are described herein in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Software components referred to herein include executable code that is packaged, for example, as a standalone executable file, a library, a shared library, a loadable module, a driver, or an assembly, as well as interpreted code that is packaged, for example, as a class. In general, the components used by the systems and methods for managing configuration data are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of checkpoint logic 180 and/or configuration server 190, according to embodiments disclosed herein. Alternatively, these diagrams may be viewed as depicting actions of an example of a method implemented by checkpoint logic 180 and/or configuration server 190. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A system, comprising:
   a memory encoded with executable instructions; and
   a processor configured to execute the instructions to:
   retrieve, from a remote server, information that describes last remotely stored configuration data for an account, the account shared by a device along with other devices;
   compare the retrieved information with information that describes locally stored configuration data for the account;
   download the last remotely stored configuration data from the remote server to replace the locally stored configuration data responsive to the comparison indicating that the last remotely stored configuration data is more recent than the locally stored configuration data;
   retrieve, from the remote server, information that describes last remotely stored configuration data for the device;
   compare the retrieved information that describes the last remotely stored configuration for the device with information that describes locally stored configuration data for the device;
   download the last remotely stored configuration data for the device from the remote server to replace the locally stored configuration data for the device responsive to the comparison indicating that the last remotely stored configuration data for the device is more recent than the locally stored configuration data for the device;
   download at least a portion of an updated version of the device-specific configuration data responsive to a change in the device-specific configuration data;
   download an updated version of the account-specific configuration data responsive to a change in the account-specific configuration data;
   provide the updated version of the account-specific configuration data to another entity responsive to the change in the account-specific configuration data, wherein providing comprises writing the updated account-specific configuration data to the another entity, wherein the another entity comprises another device associated with the account.

2. The system of claim 1, wherein the descriptive information is a version number.

3. The system of claim 1, wherein the descriptive information is a date.

4. The system of claim 1, wherein the processor is further configured to retrieve according to a digital storage media command and control (DSM-CC) User-to-Network configuration (UNConfig) request.

5. The system of claim 1, wherein the processor is further configured to retrieve the information corresponding to the last remotely stored configuration for the device and the last remotely stored configuration for the account as part of a single transaction.

6. The system of claim 1, wherein the processor is further configured to download the last remotely stored configuration data to replace the locally stored configuration data for the account and download the last remotely stored configuration to replace the locally stored configuration for the device as part of a single transaction.

7. The system of claim 1, wherein the processor is further configured to retrieve, compare, and download during a boot procedure for the device.

8. A method, comprising:
   storing account-specific configuration data at a device included among a group of devices, the account specific-configuration data capable of being shared among the group of devices common to a single account;
   storing device-specific configuration data at the device, the device-specific configuration data not shared among the group of devices;
   uploading at least a portion of an updated version of the device-specific configuration data to a remote server responsive to a change in the device-specific configuration data;
   uploading an updated version of the account-specific configuration data to the remote server responsive to a change in the account-specific configuration data; and
   providing the updated version of the account-specific configuration data to another entity responsive to the change in the account-specific configuration data, wherein providing comprises writing the updated account-specific configuration data to the another entity, wherein the another entity comprises another device associated with the account.

9. The method of claim 8, wherein providing comprises writing the updated account-specific configuration data to a storage unit accessible by at least one other device within the group of devices.

10. The method of claim 8, wherein the device-specific configuration data that is uploaded includes only a protected portion of the entire device-specific configuration data, and the protected portion persists across an equipment swap of the device.

11. The method of claim 8, wherein the device-specific configuration data that is uploaded includes only a protected portion of the device-specific configuration data, and wherein the remaining portion of the device-specific configuration data persists across a reboot of the device.

12. The method of claim 8, wherein the device-specific configuration data that is uploaded persists across an equipment swap of the device.

13. The method of claim 8, wherein uploading the updated versions of the account-specific configuration data, the device-specific configuration data, or a combination of both occurs only during specific time windows.

14. A method, comprising:
   receiving an account code identifying an account, the account shared by plural devices;
   receiving a device code identifying a device among the plural devices;
   downloading account-specific configuration data associated with the account code from a remote server responsive to determining that the account code already exists;
   downloading device-specific configuration data associated with the device code from the remote server responsive to determining that the device code already exists, responsive to a comparison indicating that the last remotely stored device-specific configuration data is more recent than locally stored device-specific configuration data;

downloading at least a portion of an updated version of the device-specific configuration data responsive to a change in the device-specific configuration data;

downloading an updated version of the account-specific configuration data responsive to a change in the account-specific configuration data;

providing the updated version of the account-specific configuration data to another entity responsive to the change in the account-specific configuration data, wherein providing comprises writing the updated account-specific configuration data to the another entity, wherein the another entity comprises another device associated with the account; and operating in accordance with the downloaded account-specific and device-specific configurations.

15. The method of claim 14, wherein the steps are performed during an install procedure for the device.

16. The method of claim 14, further comprising creating new account-specific configuration data with default values responsive to determining that the account code does not already exist at the remote server.

17. The method of claim 14, further comprising creating new device-specific configuration data with default values responsive to determining that the device code does not already exist at the remote server.

\* \* \* \* \*